United States Patent
Guzelgunler

(10) Patent No.: US 9,030,143 B2
(45) Date of Patent: May 12, 2015

(54) METHOD AND SYSTEM OF LIMITING CURRENT TO A MOTOR

(75) Inventor: Yilcan Guzelgunler, Tipp City, OH (US)

(73) Assignee: Regal Beloit America, Inc., Beloit, WI (US)

( * ) Notice: Subject to any disclaimer, the term of this patent is extended or adjusted under 35 U.S.C. 154(b) by 616 days.

(21) Appl. No.: 13/285,868

(22) Filed: Oct. 31, 2011

(65) Prior Publication Data

US 2013/0106334 A1 May 2, 2013

(51) Int. Cl.
*H02P 1/04* (2006.01)
*H02P 25/02* (2006.01)
*H02P 29/00* (2006.01)
*H02P 29/02* (2006.01)
*H02P 23/00* (2006.01)

(52) U.S. Cl.
CPC .......... *H02P 25/021* (2013.01); *H02P 29/0088* (2013.01); *H02P 29/02* (2013.01); *H02P 23/0081* (2013.01)

(58) Field of Classification Search
USPC ................. 318/461, 471, 432, 599, 811, 434, 318/400.22
See application file for complete search history.

(56) References Cited

U.S. PATENT DOCUMENTS

| | | | |
|---|---|---|---|
| 4,542,324 A | 9/1985 | Leuthen | |
| 5,076,761 A * | 12/1991 | Krohn et al. | 417/18 |
| 5,373,205 A | 12/1994 | Busick et al. | |
| 5,627,710 A | 5/1997 | Schoeffler | |
| 6,078,511 A | 6/2000 | Fasullo et al. | |
| 6,254,353 B1 * | 7/2001 | Polo et al. | 417/44.11 |
| 7,035,064 B2 | 4/2006 | Schimanek et al. | |
| 7,042,180 B2 * | 5/2006 | Terry et al. | 318/400.21 |
| 7,106,019 B2 * | 9/2006 | Becerra et al. | 318/400.01 |
| 7,319,300 B2 * | 1/2008 | Hahn | 318/400.32 |
| 7,572,108 B2 * | 8/2009 | Koehl | 417/53 |
| 7,622,876 B2 | 11/2009 | Plunkett et al. | |
| 7,652,438 B2 | 1/2010 | Rosskamp | |
| 7,679,305 B2 | 3/2010 | Eisenhardt | |
| 7,729,148 B2 | 6/2010 | Hyvärinen et al. | |
| 2006/0127227 A1 * | 6/2006 | Mehlhorn et al. | 417/53 |
| 2008/0144341 A1 * | 6/2008 | Cook | 363/53 |

FOREIGN PATENT DOCUMENTS

JP   2009190663   8/2009

* cited by examiner

*Primary Examiner* — Rina Duda
(74) *Attorney, Agent, or Firm* — Michael Best & Friedrich LLP

(57) ABSTRACT

A method of limiting current to a motor. The method comprising monitoring a speed of a motor, an input voltage of a controller, and a temperature of the controller. Determining a maximum current limit for the motor based on the monitored speed when the motor speed is below a speed threshold. Determining a maximum current limit for the motor based on the input voltage and the temperature when the motor speed is above the speed threshold and the input voltage is below an input voltage threshold. Determining a maximum current limit for the motor based on the temperature when the motor speed is above the speed threshold and the input voltage is above the input voltage threshold. Or determining a maximum current limit for the motor based on the monitored speed when the motor speed is above the speed threshold and the temperature is below a temperature threshold.

18 Claims, 3 Drawing Sheets

METHOD AND SYSTEM OF LIMITING CURRENT TO A MOTOR

BACKGROUND

The invention relates to a controller for a motor with and without a power factor correction circuit, and particularly, a controller that recalculates the maximum power provided to the motor.

A motor is designed to operate in a specific temperature range at a rated output power and input voltage. Operation beyond the maximum specified temperature for an extended period of time may cause damage to or failure of the controller (inverter) motor. In addition, variation in the input voltage affects the maximum power that can be drawn from the motor at the maximum specified operating temperature.

SUMMARY

In order to enable the motor system to operate at higher temperatures and higher speeds, the invention provides a system that reduces the operating power of the motor when operating above the maximum specified temperature and below the rated voltage at maximum specified temperature without turning off the motor. The system does so by determining a maximum current limit based on certain operating conditions, effectively de-rating (i.e., calculating a lower current limit) the system to operate under conditions beyond the normal operating parameters and at the same time protecting against overheating of the electrical components.

In one embodiment, the invention provides a system of limiting current to a motor. The system comprises of a motor and a controller. The controller includes a processor and memory. The controller is configured to monitor the speed of the motor, the input voltage of the controller, and the temperature of the controller enclosure. The controller then determines a maximum current limit for the motor based on the monitored speed when the motor speed is below a speed threshold. If, however, the motor speed is above a threshold, the controller determines a maximum current limit for the motor based on the temperature of the controller enclosure.

In another embodiment the invention provides a method of limiting current to a motor, the method comprises monitoring the speed of a motor, the input voltage of the controller, and the temperature of the controller enclosure. The method further comprises determining a maximum current limit for the motor based on the monitored speed when the motor speed is below a speed threshold and determining a maximum current limit for the motor based on the temperature inside the controller enclosure when the motor speed is above the speed threshold.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
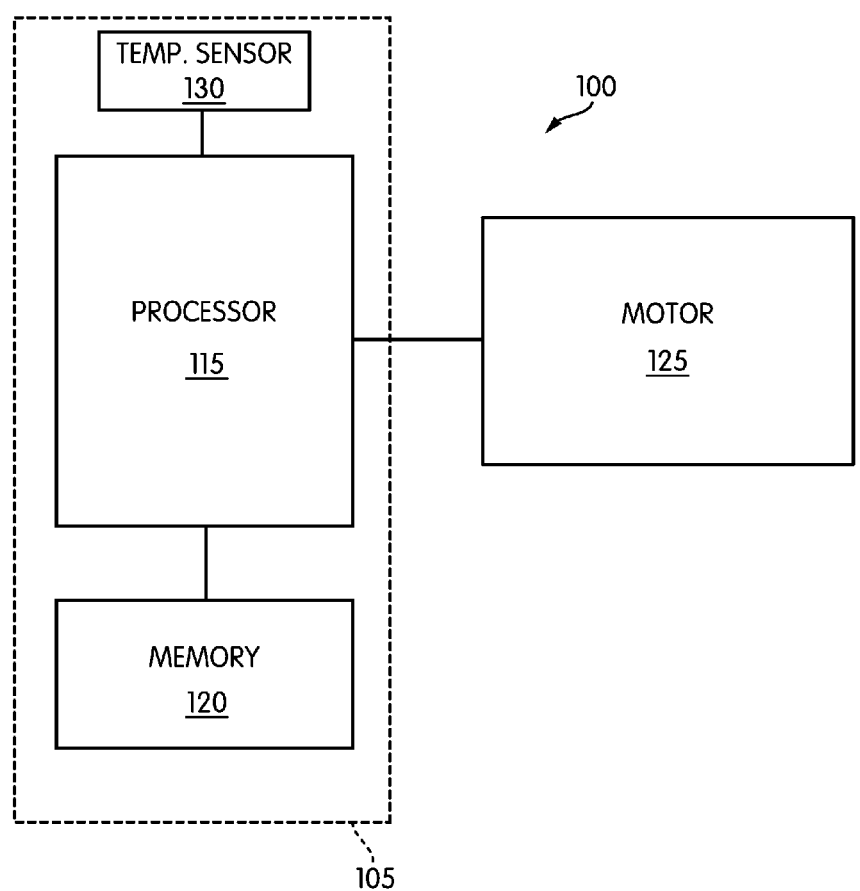
FIG. 1 is a block diagram of a variable speed motor system according to one embodiment of the invention.

FIG. 1 illustrates a variable speed motor system 100 implementing power de-rating functionality. The system includes a controller 105 with a processor 115, memory 120, and a temperature sensor 130. The memory 120 includes software instructions that are read, interpreted, and executed by the processor 115 to manipulate data or signals. The memory 120 also includes data storage memory. The temperature sensor 130 senses a temperature within the enclosure of the controller 105. The processor 115 then receives the temperature of the controller 105. The controller 105 can include other circuitry necessary for operating the controller 105. However, the invention is not limited to a controller and can be accomplished by other means, including a variety of integrated circuits, programmable devices, and/or discrete devices.

The controller 105 is connected to a motor 125. The motor 125 is a permanent magnet, brushless Permanent Magnet Synchronous (PMS) motor. The PMS motor 125 includes a stator and a permanent magnet rotor. The motor 125 can further comprise of a programmable device (not pictured), such as a microcontroller, a digital signal processor, or a similar controller having a processor and memory. The programmable device of the PMS motor uses software stored in the memory to control the electronic commutator. Although motor 125 in FIG. 1 is described as a PMS motor, the examples and methods herein can be applied to various different motors in other systems.

In the motor system 100, the controller 105 is separate from the on-board programmable device that controls the operation of the motor. However, in other embodiments, the controller 105 replaces the on-board programmable device and both controls the operation of the motor 125 and de-rates (or limits) the power to the motor 125.

In operation, the controller 105 de-rates (or limits) the power to the motor 125 by determining a maximum current limit at which the motor 125 may operate. Depending on the current operational condition of the motor 125, the maximum current limit is determined based on the speed of the motor 125, the temperature of the controller 105, or a combination of the input (or mains) voltage of the controller 105 and the temperature of the controller 105.

Figure 2:
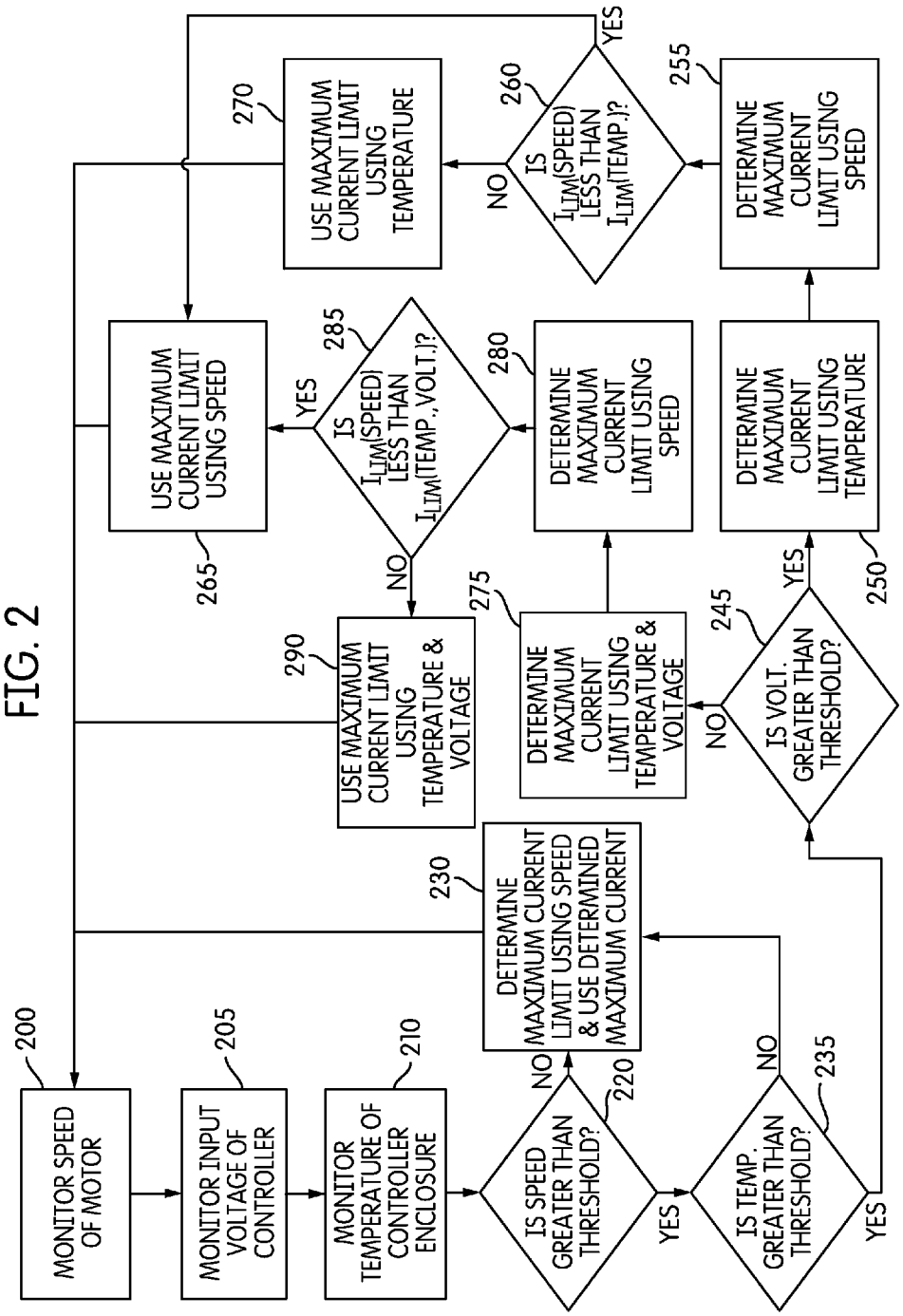
FIG. 2 is a flowchart of a method for calculating a maximum current limit for the variable speed motor system of FIG. 1.

As illustrated in FIG. 2, the controller 105 monitors the speed of the motor 125 (step 200), the input voltage of the controller 105 (step 205), and the temperature of the controller 105 (step 210). As described above, the temperature is monitored through the temperature sensor 130. The input voltage of the controller 105 is monitored through a sensing mechanism such as an analog-to-digital converter of the controller 105. Because the controller 105 controls the speed of the motor by providing the appropriate current to the phase coils of the stator, the controller 105 is already aware of the speed of the motor.

Figure 3:
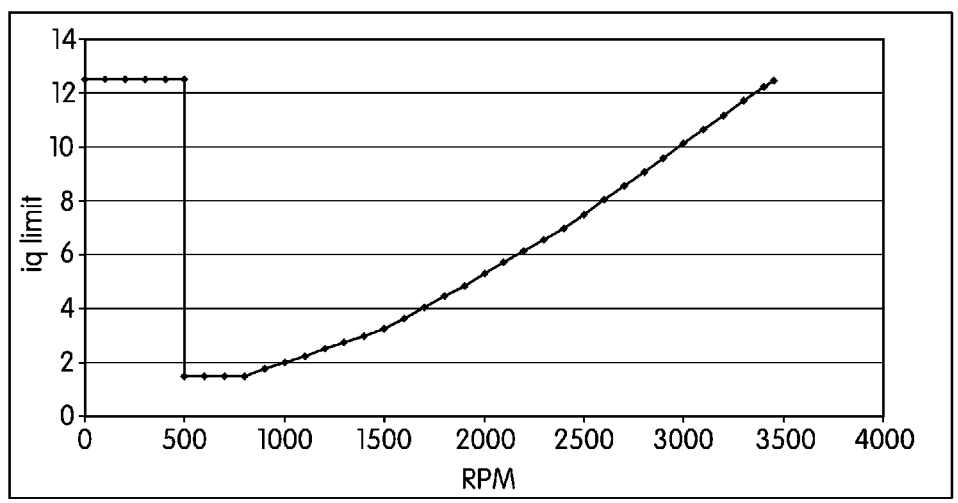
FIG. 3 is a graph illustrating a current-limit profile for determining a maximum current limit based on motor speed.

The controller 105 determines if the speed of the motor 125 is above or below a predetermined speed threshold (step 220). If the speed is below the threshold, the maximum current limit is determined based only on the speed of the motor 125 and that maximum current limit is used (step 230). In this implementation, the maximum current limit based on the speed of the motor 125 is determined based on a current limit profile. A current limit profile, as illustrated in FIG. 3, defines a maximum current limit value corresponding to the motor speed.

If, however, the speed of the motor is above the speed threshold (step 220), the controller 105 determines if the temperature of the controller 105 is above or below a predetermined temperature threshold (step 235). If the temperature is below the threshold, the maximum current limit is again determined based on the speed of the motor 125 and that maximum current limit is used (step 230).

If the temperature of the controller 105 exceeds the temperature threshold (step 235), the controller 105 determines if the input voltage of the controller 105 is above or below a predetermined voltage threshold (step 245). If the input voltage is above the threshold, the maximum current limit is determined using a first formula based on the temperature of the controller 105 (step 250). In particular, the controller 105 calculates a de-rated maximum current limit using the following formula:

$$i_{q\_limit} = I_{Q\_LIMIT} - (T_{PCB} - T_{offset}) \times K_T$$

where $i_{q\_limit}$ is the de-rated maximum current limit, $I_{Q\_LIMIT}$ is the current limit of the motor without de-rating, $T_{PCB}$ is the temperature of the controller 105 (on the printed circuit board), $T_{offset}$ is an offset value defined for the specific motor system, and $K_T$ is a compensation coefficient defined for the specific motor system.

The maximum current limit is then determined based only on the speed of the motor 125 (step 255). The controller 105 then determines whether the determined maximum current limit based on speed or the determined maximum current limit based on temperature is lower (step 260). If the determined maximum current limit based on speed is lower, then the maximum current limit based on speed is used (step 265). If the determined maximum current limit based on temperature is lower, then the maximum current limit based on temperature is used (step 270).

If the input voltage of the controller 105 is below the voltage threshold (step 245), the maximum current limit is determined using a second formula based on both the temperature and the input voltage (step 275). In particular, the controller 105 calculates a de-rated maximum current limit using the following formula:

$$i_{q\_limit} = I_{Q\_LIMIT} - [(V_{thresh} - V_{RMS}) \times K_V + (T_{PCT} - T_{offset}) \times K_T]$$

Again, $i_{q\_limit}$ is the de-rated maximum current limit, $I_{Q\_LIMIT}$ is the current limit of the motor without de-rating, $T_{PCB}$ is the temperature of the controller 105 (on the printed circuit board), $T_{offset}$ is an offset value defined for the specific motor system, and $K_T$ is a compensation coefficient defined for the specific motor system. $V_{thresh}$ is the voltage threshold used by the controller 105, $V_{RMS}$ is the RMS input voltage of the controller 105, and $K_v$ is a compensation coefficient defined for the specific motor system.

The maximum current limit is then determined based only on the speed of the motor 125 (step 280). The controller 105 then determines whether the determined maximum current limit based on speed or the determined maximum current limit based on temperature and input voltage is lower (step 285). If the determined maximum current limit based on speed is lower, then the maximum current limit based on speed is used (step 265). If the determined maximum current limit based on temperature and input voltage is lower, then the maximum current limit based on temperature and input voltage is used (step 290).

Thus, the invention provides, among other things, a system for de-rating (or limiting) the maximum power to be provided to a variable speed motor to enable operation of the motor beyond the normal operating parameters for the motor system. The maximum current limit is calculated by different methods depending on the speed and other operating conditions. Various features and advantages of the invention are set forth in the following claims.

What is claimed is:

1. A method of limiting current to a motor, the method comprising:
   monitoring a speed of a motor;
   monitoring an input voltage of a controller;
   monitoring a temperature of the controller;
   determining a maximum current limit for the motor based on the monitored speed when the motor speed is below a speed threshold; and
   determining a maximum current limit for the motor based on the temperature of the controller when the motor speed is above the speed threshold.

2. A method as set forth in claim 1 wherein the act of determining a maximum current limit for the motor based on the temperature includes determining a maximum current limit for the motor based on the temperature and the input voltage, when the motor speed is above the speed threshold and when the input voltage is below an input voltage threshold.

3. A method as set forth in claim 1 wherein the act of determining a maximum current limit for the motor based on the temperature is performed when the motor speed is above a speed threshold and the input voltage is above an input voltage threshold.

4. A method as set forth in claim 1 wherein the act of determining a maximum current limit for the motor based on the speed of the motor when the motor speed is above a speed threshold and the temperature is below a temperature threshold.

5. A method as set forth in claim 1 wherein the act of determining a maximum current limit for the motor based on the monitored temperature includes
   determining a maximum current limit according to a first formula when the input voltage is above an input voltage threshold; and
   determining a maximum current limit according to a second formula when the input voltage is below the input voltage threshold.

6. A method as set forth in claim 1, further comprising:
   determining the maximum current limit for the motor based on the speed of the motor when the motor speed is above the speed threshold;
   comparing the maximum current limit for the motor based on the speed of the motor to the maximum current limit for the motor based on the temperature of the controller when the motor speed is above the speed threshold; and
   controlling a current of the motor based on the lesser of the maximum current limit for the motor based on the speed of the motor and the maximum current limit for the motor based on the temperature of the controller when the motor speed is above the speed threshold.

7. A method as set forth in claim 1 wherein the method is performed by a controller containing a processor and memory.

8. A method as set forth in claim 1 wherein the act of controlling a current of the motor is based on the maximum current limit.

9. A motor system comprising:
   a motor;
   a controller including a processor and memory, the controller configured to
      monitor a speed of the motor,
      monitor an input voltage of the controller, monitor a temperature of the controller, and
determine a maximum current limit for the motor based on the monitored speed when the motor speed is below a speed threshold; and
determine a maximum current limit for the motor based on the temperature of the controller when the motor speed is above the speed threshold.

10. A system as set forth in claim 9 wherein the controller is configured to determine a maximum current limit for the motor based on the temperature of the controller includes determining a maximum current limit for the motor based on the temperature of the controller and the input voltage, when the motor speed is above the speed threshold and when the input voltage is below an input voltage threshold.

11. A system as set forth in claim 9 wherein the controller is configured to determine a maximum current limit for the motor based on the temperature of the controller is performed when the motor speed is above a speed threshold and the input voltage is above an input voltage threshold.

12. A system as set forth in claim 9 wherein the controller is configured to determine a maximum current limit for the motor is based on the monitored temperature includes
determining a maximum current limit according to a first formula when the input voltage is above an input voltage threshold; and
determining a maximum current limit according to a second formula when the input voltage is below the input voltage threshold.

13. A system as set forth in claim 9, further comprising the controller configured to:
determine the maximum current limit for the motor based on the speed of the motor when the motor speed is above the speed threshold;
compare the maximum current limit for the motor based on the speed of the motor to the maximum current limit for the motor based on the temperature of the controller when the motor speed is above the speed threshold; and
control a current of the motor based on the lesser of the maximum current limit for the motor based on the speed of the motor and the maximum current limit for the motor based on the temperature of the controller when the motor speed is above the speed threshold.

14. A method of limiting current to a motor, the method comprising:
monitoring a speed of a motor;
monitoring an input voltage of a controller;
monitoring a temperature of the controller;
determining a maximum current limit for the motor based on the monitored speed when the motor speed is below a speed threshold;
determining a maximum current limit for the motor based on the input voltage of the controller and the temperature of the controller when the motor speed is above the speed threshold and the input voltage of the controller is below an input voltage threshold;
determining a maximum current limit for the motor based on the temperature of the controller when the motor speed is above the speed threshold and the input voltage of the controller is above the input voltage threshold; and
determining a maximum current limit for the motor based on the speed of the motor when the motor speed is above the speed threshold and the temperature of the controller is below a temperature threshold.

15. A method as set forth in claim 14 wherein the act of determining a maximum current limit for the motor based on the monitored speed includes
determining a maximum current limit according to a first formula when the input voltage is above an input voltage threshold; and
determining a maximum current limit according to a second formula when the input voltage is below the input voltage threshold.

16. A method as set forth in claim 14, further comprising:
determining the maximum current limit for the motor based on the speed of the motor when the motor speed is above the speed threshold;
comparing the maximum current limit for the motor based on the speed of the motor to the maximum current limit for the motor based on the temperature of the controller when the motor speed is above the speed threshold; and
controlling a current of the motor based on the lesser of the maximum current limit for the motor based on the speed of the motor and the maximum current limit for the motor based on the temperature of the controller when the motor speed is above the speed threshold.

17. A method as set forth in claim 14 wherein the method is performed by a controller containing a processor and memory.

18. A method as set forth in claim 14 wherein the act of controlling a current of the motor is based on the maximum current limit.

* * * * *